United States Patent [19]

Hoff

[11] 4,428,184
[45] Jan. 31, 1984

[54] SAFETY MOUNTING FOR LAWN MOWER BLADE

[75] Inventor: Stephen J. Hoff, Richmond, Ind.

[73] Assignee: Hoffco, Inc., Richmond, Ind.

[21] Appl. No.: 364,422

[22] Filed: Apr. 1, 1982

Related U.S. Application Data

[63] Continuation-in-part of Ser. No. 158,700, Jun. 12, 1980, Pat. No. 4,326,368, which is a continuation-in-part of Ser. No. 114,956, Jan. 24, 1980, Pat. No. 4,316,355.

[51] Int. Cl.³ .......................................... A01D 55/18
[52] U.S. Cl. ................................................... 56/295
[58] Field of Search ....................... 56/295, 17.4, 17.5, 56/255, 256

[56] References Cited

U.S. PATENT DOCUMENTS 3,044,241  7/1962  Snider .................................. 56/295

FOREIGN PATENT DOCUMENTS 1901723  8/1970  Fed. Rep. of Germany ........ 56/295

Primary Examiner—Jay N. Eskovitz
Attorney, Agent, or Firm—Barnes & Thornburg

[57] ABSTRACT

A rotary lawn mower blade mounted on a blade carrier by diametrically spaced bolts is further retained against release from the drive shaft by a retainer fixed on the drive shaft and having a shank extending through a central opening in the blade and having an enlarged head to obstruct separation of the blade from the retainer. Preferably, the blade opening is larger than the shank and the retainer head is in the form of a transverse bar, narrower than such opening, so that the blade can be removed by manipulation in one direction to an eccentric position, then tilted to disengage it from one end of the bar, and then moved in the opposite direction to disengage it from the other end of the bar.

3 Claims, 3 Drawing Figures

SAFETY MOUNTING FOR LAWN MOWER BLADE

This is a continuation-in-part of co-pending application Ser. No. 158,700, filed June 12, 1980, for CLUTCH AND BRAKE FOR ROTARY LAWN MOWER, now U.S. Pat. No. 4,326,368 of Apr. 27, 1982, which is a continuation-in-part of application Ser. No. 114,956, filed Jan. 24, 1980 now U.S. Pat. No. 4,316,355 of Feb. 23, 1982.

This invention relates to a safety mounting for the blade of a rotary lawn mower. In such a mower, cutting is done with a heavy blade carried by the lower end of an engine shaft or other drive shaft and which rotates in a plane normal to the axis of such shaft and close to ground level. The heavy blade has a high polar moment of enertia, and in the past has been relied on to provide the primary flywheel effect for the engine. In the use of such a lawn mower, if the end of the rapidly rotating blade strikes a fixed object so that the end of the blade is stopped, the blade tends to continue rotation about the fixed object as a fulcrum and exerts heavy stress on the shaft and mounting.

The United States Consumer Product Safety Commission has recently promulgated a safety standard for walk-behind power lawn mowers which requires that all lawn mowers manufactured after June 31, 1982 must have a control (deadman control) and a blade-control system which will (1) prevent the blade from operating unless the operator actuates the control; (2) requires continuous contact with the control in order for the blade to continue to be driven; and (3) cause the blade to stop within three seconds after release of the control (Federal Register, Volume 44, No. 33, Feb. 13, 1979, pages 9990 et seq., 9993; and subsequent amendments thereof). To meet this safety standard, it is generally proposed to mount the blade on a shaft by means of a clutch-brake mechanism which declutches the blade from the shaft when the deadman control is released, and applies a brake to stop the blade. In such mechanism, the blade is carried by a blade carrier rotatable on the axis of the drive shaft, and the blade is commonly attached to such carrier by a pair of diametrically spaced eccentric bolts.

With the use of such a clutch-brake mechanism, the blade can no longer serve to provide flywheel effect for the engine, particularly when it is declutched therefrom, and in my U.S. Pat. No. 4,148,173 of Apr. 10, 1979, there is disclosed a clutch-brake mechanism which includes a heavy flywheel mounted on the hub of the clutch-brake mechanism, near the plane of the blade mounting.

When the blade is mounted by spaced eccentric bolts, and especially when the blade-mounting mechanism includes a flywheel, the stress on the blade-mounting mechanism when the blade strikes a fixed object is especially severe, and may indeed shear one or both of the blade-mounting bolts so as to permit the blade to come loose and be thrown outward forcibly. This can produce serious danger to the operator and to bystanders.

The present invention seeks to prevent that danger by providing a secondary barrier against release of the blade from its mounting and the shaft.

In accordance with the present invention, the blade is provided with a central opening, on the axis of the shaft on which the blade carrier is mounted, and the shaft carries a retainer which extends through such opening and has an enlarged head which will obstruct axial separation of the blade from the retainer in the event the blade bolts fail. Preferably, the retainer head and blade opening are such that the head will pass through the blade opening only by manipulation of the blade in a manner not likely to occur in the event the blade bolts are sheared. In a preferred embodiment in accordance with the present invention, the blade has a generally circular central opening, and the retainer has a shank portion of smaller diameter than such opening and has an enlarged head which includes two diametrically opposite extensions, desirably of different lengths, which normally block release of the blade from the retainer but which permit such release by first manipulating the blade to an eccentric position, then tilting the blade to disengage the shorter of the two extensions, and then moving the tilted blade in the opposite direction to disengage the second of such extensions.

The accompanying drawings illustrate the invention and show an embodiment exemplifying the best mode of carrying out the invention as presently perceived. In such drawings.

Figure 1:
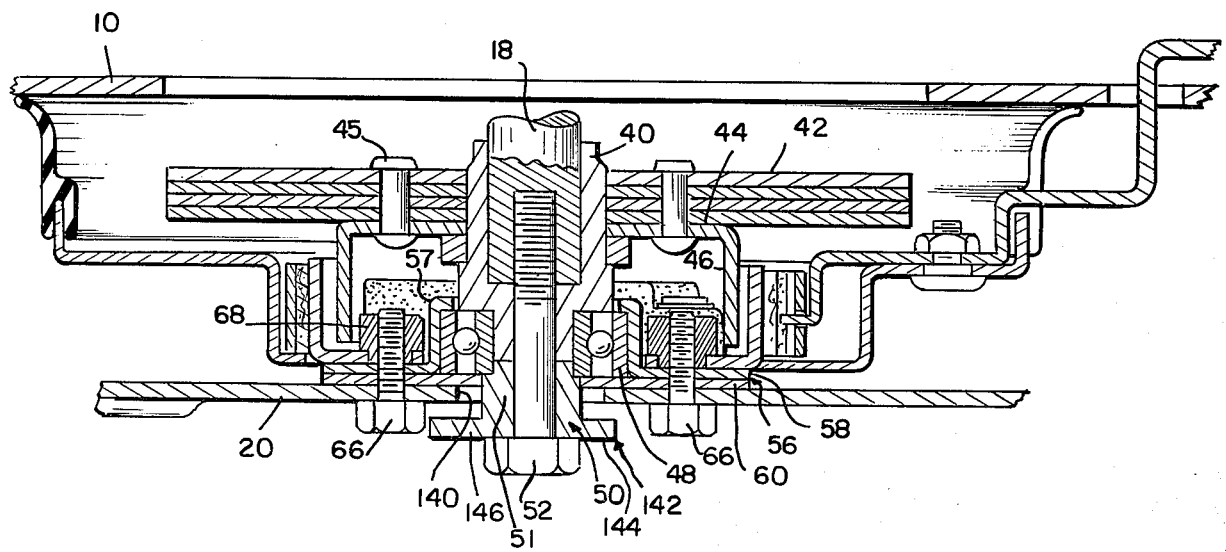
FIG. 1 is a vertical section of a clutch and brake mechanism with which a rotary lawn mower blade is mounted on its driving shaft and which includes a flywheel on the hub of such mechanism.

The lawn mower mechanism shown in FIG. 1 is similar to that of co-pending application Ser. No. 158,700, now U.S. Pat. No. 4,326,368, to which reference may be made for further details of the lawn mower as a whole and of the clutch and brake mechanism shown. The mechanism shown in FIG. 1 comprises a lawn mower housing 10 supported on wheels and carrying an internal combustion engine, not shown, which has a vertical shaft 18 projecting downward and carrying a rotary cutter blade 20 at is lower end. The blade 20 is connected to the shaft and controlled by a clutch and brake mechanism.

The clutch and brake mechanism comprises a hub 40 mounted on the engine shaft 18 and keyed thereto, and which carries a flywheel 42 and a clutch-driving member 44 having an outer depending cylindrical wall or drum 46. The flywheel 42 is made of four heavy-gauge stampings which are connected to each other and to the radial flange of the driving member 44 by rivets 45, and this assembly is securely locked to the hub 40. The driving drum lies axially close to the flywheel and extends downward with its open end at the bottom.

The hub 40 has a reduced lower end on which the inner race 48 of a ball bearing is mounted and clamped between a shoulder on the hub and an opposite shoulder on an annular spacer and blade retainer 50. The hub 40 and blade retainer 50 are held in assembled relation and secured to the shaft 18 by a bolt 52. The outer race 54 of the ball bearing supports a shoe carrier 56 which comprises an upper hat-shaped member 58 with a central cylindrical crown 57 engaged about and over the top edge of the outer race 54, and a bottom circular plate 60 fixed against the radial flange of the upper member 58 by means of rivets formed integral with and supporting pivot pins for driven clutch elements. In use, the two members 58 and 60 of the shoe carrier are also clamped together by two blade bolts 66 threaded into clinch nuts 68 fixed in openings in the outer flange portion of the upper carrier plate 58. There are two such clinch nuts 68 located at diametrically opposite points, circumferentially between the ends of the clutch and brake shoes mentioned below. The blade 20 has two bolt holes 21 to pass the two blade bolts 66. The blade carrier 56 lies with its crown 57 extending inward of the open end of the driving drum, in nested relation therewith, and with its blade-carrying flange 58-60 just below that open end, and hence close to the flywheel 42.

As more fully shown in application Ser. No. 158,700, two clutch and brake shoes are pivotally mounted on the carrier 58-60. Such shoes have arcuate drum-engaging clutching elements 74 which lie within and make clutching engagement with the inside surface of the driving drum 46, and brake drum segments 86 disposed radially outward from the driving drum 46 in position to be engaged by a brake band 90. The blade carrier 56 is driven by the clutch elements from the driving drum 44, and braked by the brake band 90, all under the control of a deadman control, as explained in application Ser. No. 158,700.

In accordance with the present invention, the spacer and blade retainer 50, which bears against the lower end of the inner bearing race 48 and is fixed on the shaft 18 by a bolt 52, has a cylindrical shank portion 51 which extends through a central circular opening 140 in the blade 20. The lower end of the spacer 50, below the blade 20, is formed with an enlarged head 142 of sufficient dimension in at least one direction to prevent separation of the blade 20 from the blade carrier by liner movement of the blade axially of the shaft. There is sufficient clearance, however, to permit the shaft and spacer 50 to rotate relative to the blade, as when the blade carrier 56 is declutched from the driving drum 46 and braked to a stop while the shaft 18 and driving drum 46 continues to rotate with the engine.

Figure 2:
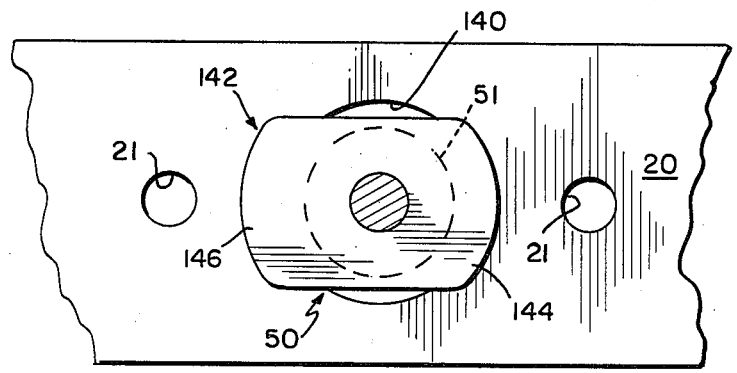
FIG. 2 is a bottom elevation of the blade mounting shown in FIG. 1.
Figure 3:
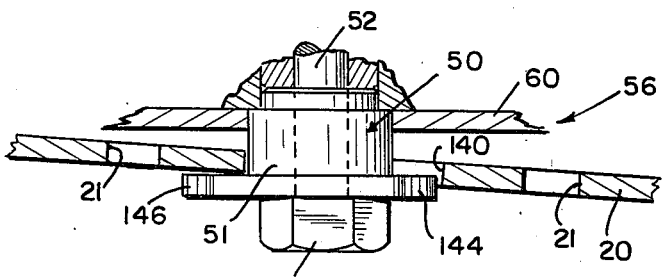
FIG. 3 is a side elevation of the blade mounting shown in FIG. 2.

Mounting and removal of the blade on and from the blade carrier with the arrangement so far described can be accomplished by removing not only the blade bolts 66, but also removing the shaft bolt 52 and the spacer 50. Preferably, however, the opening 140 in the blade and the spacer 50 and its enlarged head 142 are so interrelated that the blade may be removed from its carrier without also removing the spacer 50 and the shaft bolt 52. In accordance with the present invention, this may be done by interrelating the blade opening 140 and the spacer so as to permit such removal by manipulation of the blade 20. As shown in FIGS. 2 and 3, this may be done by making the blade opening 140 of substantially larger size than the shank 51 of the spacer 50 and forming the enlargement 142 on the spacer as two diametrically opposite radial projections 144 and 146. Both projections are longer than the radius of the blade opening 140, and the projection 144 is shorter than the projection 146. The length of the shorter projection and the size of the opening 140 are such that the shorter projection will pass through the blade opening 140 when the blade is moved in the direction of such projection 144 to the limit of its movement permitted by the clearance between the larger opening 140 and the smaller shank 51 of the spacer 50, as shown in FIG. 3. With the parts in the relationship shown in that figure, the blade may be tilted from a plane normal to the axis of the extension 50 to carry the right-hand edge of the opening 140 downward past the shorter extension 144. This will disengage the right-hand side of the blade from the enlarged head 142 of the spacer 50, and the tilted blade may then be moved to the left to disengage the opposite side of the blade from the longer extension 146.

In mounting the blade 20 on the blade carrier 56, the central blade opening 140 is first engaged over the longer projection 146 of the spacer head 142, the blade then moved in the direction of the shorter head projection 144 until that projection may be passed through the blade opening 140 to and past the position shown in FIG. 3. The blade is then moved against the bottom plate 60 of the blade carrier 56, and the blade bolts 66 are inserted through the bolt holes 21 in the blade into the nuts 66 carried by the blade carrier. As indicated above, removal of the blade from the blade carrier is by a procedure just the reverse of the mounting procedure. The blade nuts 66 are removed, the blade 20 is then moved in the direction of the shorter extension 144 of the enlarged head 142 of the spacer 50 to the limit of its position as shown in FIG. 3, the blade is then tilted to disengage it from such shorter extension 144, and the blade is then moved in the opposite direction to disengage it from the longer extension 146.

In the event the end of the blade strikes a fixed object during mowing operations, and the resulting stress is sufficient to shear the blade bolts 66, the extension 50 and its enlarged head 142 will tend to retain the blade on the mower and prevent it from being thrown out from the mower to endanger the operator or bystanders. When the blade bolts are sheared, the blade will be trapped by the enlarged head 142 of the spacer and retained in place. While it is conceivable that the blade could possibly disengage itself from the retainer 50 and its enlarged head 142, such disengagement requires a particular series of manipulations of the blade relative to the retainer which is not likely to occur, especially since the spacer and its head are carried with the engine shaft which under the circumstances will continue to rotate at high speed.

What is claimed is:

1. A safety mounting for a rotary lawn mower blade, comprising a blade carrier mounted for rotation on the axis of a depending drive shaft and a plurality of eccentrically positioned blade bolts for securing a blade to the carrier, a blade having bolt holes for the reception of said blade bolts and having a central opening on the axis of the carrier, a blade retainer fixed on the drive shaft and extending through said central blade opening in rotatable relation with the blade, and an enlarged head on the retainer, below the blade, and operative to obstruct axial separation of the blade from the retainer in the event the bolts fail to hold the blade on the carrier during operation of the mower, said enlarged head comprising two opposite projections having a combined length greater than the width of the central blade opening and said opening having a size and shape relative to the shank of the blade retainer to permit the blade to be moved radially of the retainer to clear one projection, the blade being then tiltable to be disengaged from that projection and then movable in the opposite direction to clear the second projection.

2. A safety mounting for a rotary lawn mower blade, comprising a blade carrier mounted for rotation on the axis of a depending drive shaft and a plurality of eccentrically positioned blade bolts for securing a blade to the carrier, a blade having bolt holes for the reception of said blade bolts and having a central opening on the axis of the carrier, a blade retainer fixed on the drive shaft and extending through said central blade opening in rotatable relation with the blade, and an enlarged head on the retainer, below the blade, and operative to obstruct axial separation of the blade from the retainer in the event the bolts fail to hold the blade on the carrier during operation of the mower, said enlarged head comprising two opposite projections having a combined length greater than the width of the central blade opening and said opening having a size and shape relative to the shank of the blade retainer to permit the blade to be moved radially of the retainer to clear one projection, the blade being then tiltable to be disengaged from that projection and then movable in the opposite direction to clear the second projection, one of the projections being longer than the other and the central blade opening being of a size to clear the shorter projection but not the longer projection so that disengagement of the blade requires manipulation of the blade to first clear the shorter projection for passage through the blade opening.

3. A safety mounting for a rotary lawn mower blade, comprising a blade carrier mounted for rotation on the axis of a depending drive shaft and a plurality of eccentrically positioned blade bolts for securing a blade to the carrier, a blade having bolt holes for the reception of said blade bolts and having a central opening on the axis of the carrier, a blade retainer fixed on the drive shaft and extending through said central blade opening in rotatable relation with the blade, and an enlarged head on the retainer and operative to obstruct separation of the blade from the retainer, said central opening providing clearance for limited movement of the blade in its plane relative to the axis of the shaft, and said head having a projection of a length greater than the extent of such limited movement so as to prevent disengagement of the blade when moved in the direction of such projection, said opening and head being such that by movement of the blade in the opposite direction it can be tilted to disengage it from one side of the head and can then be moved in the direction of said projection to disengage it therefrom.

* * * * *